UNITED STATES PATENT OFFICE.

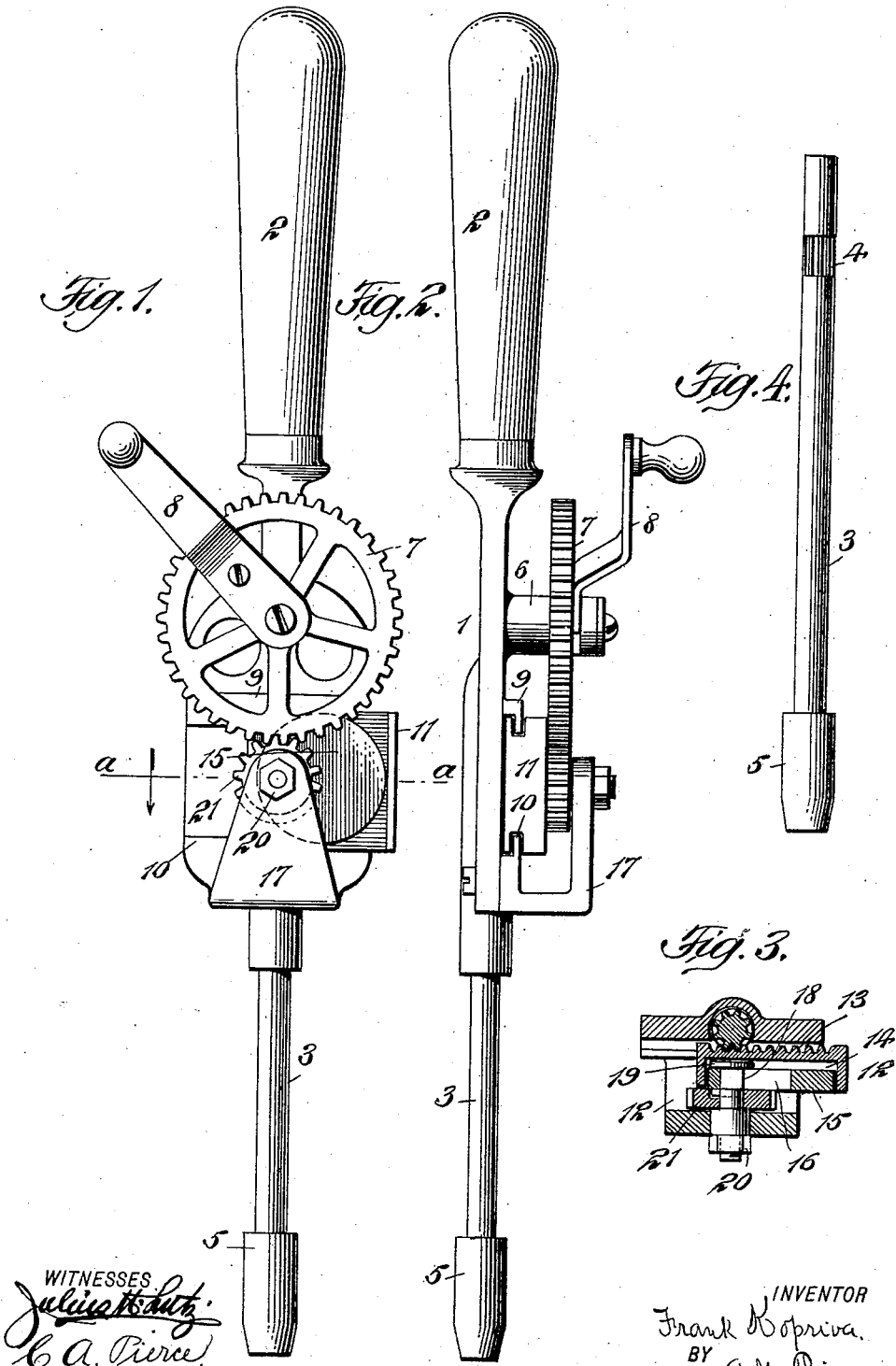

FRANK KOPRIVA, OF NEW YORK, N. Y.

VALVE-SEAT GRINDER.

No. 886,002.　　　　Specification of Letters Patent.　　　　Patented April 28, 1908.

Application filed November 4, 1907. Serial No. 400,465.

*To all whom it may concern:*

Be it known that I, FRANK KOPRIVA, a citizen of the United States, residing at New York, in the county of New York and State of New York, have invented certain new and useful Improvements in Valve-Seat Grinders, of which the following is a specification, reference being had therein to the accompanying drawing.

My invention relates especially to means and mechanism employed for grinding valve-seats, and has for its object the provision of a tool whereby such grinding may be easily and accurately accomplished.

To attain the desired end, my invention consists in certain novel and useful combinations or arrangements of parts, and peculiarities of construction and operation, all of which will be hereinafter first fully described, and then pointed out in the claims.

In the drawing, Figure 1 is a front elevation and Fig. 2 a side elevation of my grinder. Fig. 3 is a cross-sectional view at line *a—a* of Fig. 1. Fig. 4 is a view in elevation of the chuck-spindle, removed from the rest of the mechanism.

Similar numerals of reference, wherever they occur, indicate corresponding parts in all the figures.

1 is the main frame of the implement, having a holding handle 2.

3 is a spindle provided with a gear 4, and a chuck 5 for holding the grinding device.

6 is a stud whereon is rotatably mounted a gear 7 having a handle 8.

9 and 10 are guide-ways wherein is movably held a block 11 having at each side a lip 12, and at the rear a rack 13 which engages the gear 4.

14 is a slot in the block 11.

15 is an eccentric having a slot 16 therein, and located in the space between the lips 12 of the block 11.

Journaled in a bracket 17 is a shaft 18 having at its inner end a head 19 and at its outer end an adjusting nut 20. The shaft 18 extends through the slot 16 in the eccentric 15, and bears a gear 21 which meshes with the gear 7.

When the parts are in the position shown in the drawing, the eccentric gives the block 11 its greatest reciprocal movement, turning the chuck-spindle with its greatest reciprocal rotation, in accordance with the requirements of the grinding to be done.

In order to lessen the distance of reciprocation, or adjust the implement to give the requisite movement, the nut 20 is loosened, moved so as to bring its axis nearer the center, and the nut again tightened. The nearer the eccentric is centered, the smaller will be the reciprocal movement of the spindle.

Having now fully described my invention, what I claim as new therein, and desire to secure by Letters Patent, is:

1. A valve-seat grinder in which is comprised a frame carrying rotatable mechanism, rotatable mechanism, a chuck-spindle, a gear on the chuck-spindle, a rack, and an eccentric engaging said rack, substantially as shown and described.

2. In a device of the character herein specified, a chuck-spindle provided with a gear, a rack engaging said gear, an eccentric for reciprocating said rack, and means for regulating the orbit of rotation of the eccentric.

In testimony whereof I hereto affix my signature in presence of two witnesses.

FRANK KOPRIVA.

Witnesses:
　PETER KUDRLIK,
　FRANK N. GORAK.